(12) United States Patent
Epstein

(10) Patent No.: US 7,006,658 B2
(45) Date of Patent: Feb. 28, 2006

(54) VARYING SEGMENT SIZES TO INCREASE SECURITY

(75) Inventor: Michael Epstein, Spring Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 758 days.

(21) Appl. No.: 10/024,787

(22) Filed: Dec. 20, 2001

(65) Prior Publication Data

US 2003/0118208 A1 Jun. 26, 2003

(51) Int. Cl.
*G06K 9/00* (2006.01)
(52) U.S. Cl. ............... 382/100; 380/201; 713/176
(58) Field of Classification Search ........ 380/201–203; 382/100; 386/94; 704/273; 713/176
See application file for complete search history.

(56) References Cited

U.S. PATENT DOCUMENTS

| 5,984,364 A | 11/1999 | Diamond ............... 283/67 |
| 0,172,395 A1 | 11/2002 | Foote et al. ............ 382/100 |
| 6,490,353 B1 * | 12/2002 | Tan ......................... 380/37 |
| 6,671,407 B1 * | 12/2003 | Venkatesan et al. ..... 382/232 |
| 2001/0051996 A1 * | 12/2001 | Cooper et al. .......... 709/217 |
| 2002/0172395 A1 * | 11/2002 | Foote et al. ............ 382/100 |
| 2003/0070075 A1 * | 4/2003 | Deguillaume et al. ... 713/176 |

FOREIGN PATENT DOCUMENTS

| EP | 0644474 A1 | 3/1995 |
| EP | 644474 A1 * | 3/1995 |
| EP | 1032205 A2 | 8/2000 |
| EP | 1195761 A2 | 4/2002 |
| EP | 1195761 A2 * | 4/2002 |

OTHER PUBLICATIONS

US 000040 Filed on Mar. 28, 2000, U.S. Appl. No. 09/536944, Inventors: Antonius A. Staring et al. Entitled: Protecting Content Form Illicit Reproduction by Proof of Existence of a Complete Data Set via Self-Referencing Sections.
US 010675 Filed Concurrently, Co-Pending.
Dug-Ryung et al: "A robust data embedding using perceptual adaptive watermark" Circuits and Systems, 1998. IEEE APCCAS 1998. The 1998 IEEE Asia-Pacific Conference. Nov. 24, 1998, pp. 415-418.
Choong-Hoon et al: Adaptive digital image watermarking using variable size of blocks in frequency domain; TENCON 99. Proceedings of the IEEE Region 10 Conference. Sep. 15, 1999, pp. 702-705.

* cited by examiner

*Primary Examiner*—Bhavesh M. Mehta
*Assistant Examiner*—Yubin Hung
(74) *Attorney, Agent, or Firm*—Larry Liberchuk

(57) ABSTRACT

A security system is configured to use a variable length encoding of a security identifier for segments of protected content material. In this system, a distinction is made between a "zero" information bit, and the "absence" of the information bit in a shorter information item. A conventional N-bit information encoding is encoded as a variable bit encoding, wherein the information encoding ranges from N−k bits to N+k bits. By distinguishing "zero" bits from "absent" bits, this variable bit encoding allows for $2^{N-k}+2^{N-(k-1)} \ldots +2^N \ldots +2^{N+(k-1)}+2^{N+k}$ possible unique information values. Preferably, the number of bits used for each encoding of a segment of a data set is a random value, further adding to the complexity of creating a dictionary mapping for protected content material.

15 Claims, 1 Drawing Sheet

VARYING SEGMENT SIZES TO INCREASE SECURITY

BACKGROUND OF THE INVENTION

1. Field of the Invention

This invention relates to the field of security, and in particular to the protection of copy-protected content material.

2. Description of Related Art

The protection of data is becoming an increasingly important area of security. In many situations, the authority to copy or otherwise process information is verified by evaluating the encoding of copy-protected material for particular characteristics. For example, copy-protected material may contain watermarks or other encodings that identify the material as being copy-protected, and also contains other encodings that identify whether this particular copy of the material is an authorized copy, and whether it can be copied again. For example, content material may be "watermarked" by an additional encoding process that adds a watermark that is not noticeable when the content material is being rendered in its appropriate form, but is detectable by a watermark detection process. Attempting to remove the watermark causes damage to the content material. When a watermark is detected, the content material is further evaluated to determine whether it is an authorized copy.

To assure that the content material is truly authorized, and that illicit content material has not been substituted for material that is authorized, the content material is often 'bound' to the parameter that is used to determine the authorization. For example, the authorization parameter may correspond to a hash value that is derived from the content material. To verify that the authorization corresponds to the proffered content material, a hash value of the proffered content material is determined, and compared to the original hash value contained in the authorization parameter. If the hash values do not match, further rendering of the content material ceases. Because the determination of a set of values that will produce a particular hash value is virtually impossible, in a cryptology sense, the comparison of hash values is commonly accepted as 'proof' that the original material and the proffered material are equivalent.

For large data sets, the data is partitioned into segments, and each segment is bound to an identifier that is used to determine the authorization to access the particular segment of the data set. To assure that each segment is bound to the data set, the identifier typically includes a common parameter, such as a data set identification number, that is associated with the particular data set.

Generally, the bandwidth available for encoding information into a watermark is extremely limited. A bandwidth of one bit per second of watermark is not uncommon. As such, the number of bits that available for encoding identifiers of segments and/or data sets is limited. For example, a typical segment of a CD is approximately fifteen seconds in duration. Thus, the identifier that is bound to each segment is limited to approximately fifteen bits. Increasing the length of each CD segment will increase the number of bits available for encoding in the watermark, but in any event, the number of unique identifiers of segments of a CD, or other media, will be finite.

As is known in the art, systems that rely upon a finite number of unique identifiers is vulnerable to a "dictionary" attack, wherein each possible identifier is included in a dictionary. For example, in the prior example of a finite-sized data identifier, more than one data set may be assigned the same data identifier. In this case, an attacker may substitute segments from one data set for segments of another data set having the same data identifier. Because the substituted segment has the same data identifier, the substitution will generally be undetectable by the verification system.

BRIEF SUMMARY OF THE INVENTION

It is an object of this invention to improve the security provided by encoding segments of a data set with a finite-sized identifier. It is a further object of this invention to increase the number of unique identifiers available to a watermarking system, without increasing the information-carrying bandwidth of the watermark.

These objects and others are achieved by providing a security system that is configured to use a variable length encoding of a security identifier for segments of protected content material. In this system, a distinction is made between a "zero" information bit, and the "absence" of the information bit in a shorter information item. A conventional N-bit information encoding is encoded as a variable bit encoding, wherein the information encoding ranges from N−k bits to N+k bits. By distinguishing "zero" bits from "absent" bits, this variable bit encoding allows for $2^{N-k} + 2^{N-(k-1)} \ldots + 2^N \ldots + 2^{N+(k-1)} + 2^{N+k}$ possible unique information values. Preferably, the number of bits used for each encoding of a segment of a data set is a random value, further adding to the complexity of creating a dictionary mapping for protected content material

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

For ease of reference and understanding, this invention is presented hereinafter in the context of a copy-protected CD that is organized into finite-length segments, although the principles of this invention are not limited to this particular media.

Copending U.S. patent application "PROTECTING CONTENT FROM ILLICIT REPRODUCTION BY PROOF OF EXISTENCE OF A COMPLETE DATA SET VIA SELF-REFERENCING SECTIONS", U.S. Ser. No. 09/536,944, filed Mar. 28, 2000 for Antonius A. M. Staring, Michael A. Epstein, and Martin Rosner, Attorney Docket US000040, incorporated by reference herein, addresses the illicit distribution of select content material from a collection of copy protected content material. Often, a song is 'ripped' from a CD and illicitly made available for distribution via the Internet. Each subsequent download of the song deprives the owner of the copyrights to the song of rightful royalties. A premise of this copending patent application is that the downloading of a song will be discouraged if the user is required to also download the entire contents of the CD. That is, due to bandwidth limitations and other factors, the illicit download of an entire CD is deemed to be substantially less likely than the illicit download of an individual song.

To verify that an entirety of the collection of content material is present when a particular song is presented for rendering, a compliant rendering device accesses other segments of the collection, to verify their presence. To assure that these other sections belong to the same CD, an identifier in the watermark of each segment of the CD is bound to the segment.

As noted above, the bandwidth available for encoding information into a watermark is extremely limited, and the information-carrying capability of a typical watermark for a CD segment is limited to under twenty bits. Increasing the length of each CD segment will increase the number of bits available for encoding in the watermark, but in any event, the number of unique identifiers of segments of a CD, or other media, will be finite.

With the revenues that are at stake for particular content material, such as recorded songs, videos, and so on, it can be expected that substantial efforts will be launched to 'crack' any encoding that protects this content material from illicit copying. Given the finite number of bits available for binding the watermark to the content material, it is feasible to create a collection of most, if not all, possible watermark values, with corresponding bound segments. This collection may be the result of any of a variety of data collection and organizing efforts, such as an organized effort among a variety of illicit providers, or merely a categorization of segments of content material that a user has previously downloaded. In like manner, the watermark values of each segment of popular CDs can be determined and published.

Figure 1:
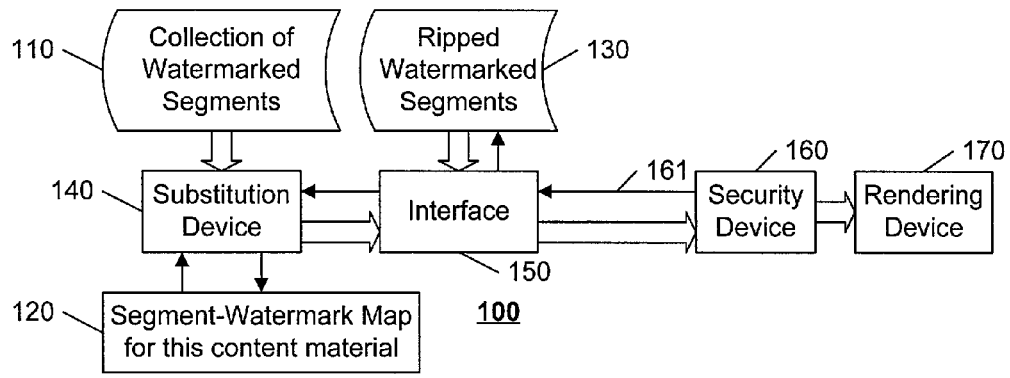
FIG. 1 illustrates an example block diagram of a system that is configured to overcome a security procedure based on watermarks.

FIG. 1 illustrates a potential use of this collection of watermarked segments 110 and the determined mapping 120 of each segment to a watermark value in an unauthorized copying system 100 that is configured to overcome a copy protection scheme based on watermarks. Copending U.S. patent application "METHOD AND APPARATUS FOR OVERCOMING A WATERMARK SECURITY SYSTEM", Ser. No. 10/024,773, filed Dec. 20, 2001, for Michael A. Epstein, Attorney Docket US010675, discloses a technique for overcoming the aforementioned watermark-based copy protection scheme, and is incorporated by reference herein.

In the example of FIG. 1, a rendering device 170 is configured to request sequential segments of content material to be rendered to the providing system, via a security device 160. Generally, the providing system is, for example, a CD player that contains an authorized copy of a CD, and the requested sequential segments correspond to the song that is to be rendered. In the security system of the aforementioned copending application, the security device 160 is configured to request the sequential segments from the providing system, and also to select segments from other songs on the CD, to verify that these other segments are also present at the providing system, thereby verifying, to some degree of confidence, that the complete CD is present. Alternatively, the system may be configured such that the providing system provides sequential segments directly to the security device 160 for forwarding to the rendering device 170, without requests from the rendering device. In this alternative arrangement, the security device 160 initiates the requests to the providing system upon receipt of the unsolicited sequential segments from the providing system.

The example unauthorized providing system 100 is configured to provide the watermarked segments 130 of desired material that has been ripped from a CD, and to satisfy segment requests for other material that had been on the CD from a collection of watermarked segments 110 that have been previously downloaded by the user of the unauthorized providing system 100. The interface 150 receives the segment request 161 from the security device 160, and determines whether the segment corresponds to a segment in the ripped watermarked segments 130. If the requested segment 161 is not contained in the ripped watermark segments 130, the interface 150 forwards the segment request 161 to a substitution device 140. The substitution device 140 determines the corresponding watermark for the requested segment 161, based on a 'dictionary' 120 that maps segment numbers to watermarks for the current content material. The substitution device 140 then retrieves the watermarked segment corresponding to the requested segment request from the collection of previously downloaded watermarked segments 110. Note that the substituted watermarked segment from the collection 110 is not the segment that the security device 160 expects, in that it does not belong to the same data set as the ripped watermarked segments 130. However, because the substituted watermark and associated segment from the collection 110 has a duplicate watermark identifier, the security device 160 will conclude that it is the proper watermarked segment. Thus, the unauthorized providing system will overcome the intended protection provided by the security device 160.

The downloaded ripped watermarked segments 130 are added to the collection 110 of previously downloaded watermarked segments, thereby facilitating subsequent substitutions for other data sets. Note that the map 120 and the collection 110 need not be exhaustive to successfully overcome the intended protection provided by the security device 160. The security device 160 is preferably configured to randomly sample the data set, to determine with some degree of confidence that the entire data set is present. Thus, the likelihood of an incomplete mapping 120 or collection 110 successfully overcoming the intended protection is dependent upon the likelihood that the security device will select a segment that is not included in either the mapping 120 or the collection 110. Thus, an illicit user may initially have a low success rate, but, with continued downloading of desired segments, will continually increase the success rate.

In accordance with this invention, the number of unique identifiers that can be encoded in a watermark is increased, without increasing the bandwidth or average size of the watermark. In this manner, the likelihood of a segment request 161 being included in the collection 110 of prior downloaded watermarked segments is reduced, thereby reducing the likelihood of successfully overcoming the protection provided by the security device 160, or other security devices that relies on a verification of watermarked entities.

Figure 2:
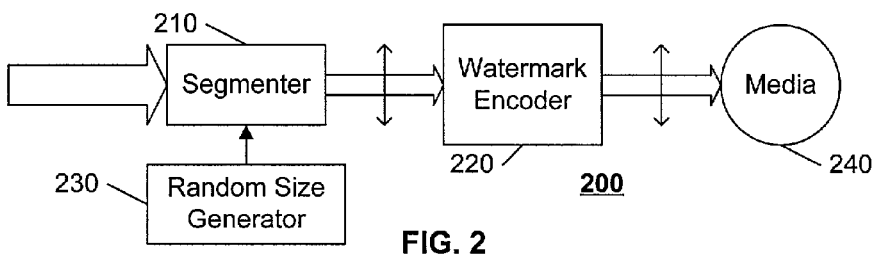
FIG. 2 illustrates an example block diagram of a watermark encoder that is configured to provide variable length watermarks in accordance with this invention.

FIG. 2 illustrates an example block diagram of a watermark encoding system 200 in accordance with this invention. The system 200 includes a watermark encoder 220 that is configured to watermark a segment of content material with an information-carrying watermark. Consistent with conventional watermarking processes, the amount of information that a watermark may carry is dependent upon the size of the segment being watermarked. In accordance with this invention, a shorter watermark is distinguishable from a longer watermark, even though both watermarks may contain the same information. That is, for example, if the information content is the numeral 39, a six-bit encoding of 010111 is distinguishable from an eight-bit encoding of 00010111. In this manner, the same information can be encoded in a variety of forms, thereby reducing the likelihood of duplicate information encodings among different sets of content material. In accordance with a second aspect of this invention, a random size selector 230 randomly determines the size of the watermark for encoding.

In a preferred embodiment of this invention, the encoding system 200 controls the size of the watermark by controlling the size of each segment that is provided to the watermark encoder. In this manner, the entire bandwidth of the watermarking process can be utilized. In this embodiment, a segmenter 210 partitions the content material into randomly sized segments, based on the output of the random (including pseudo-random) size generator 230. The random size generator 230 is configured to provide a size parameter that is within a given upper and lower bound, using techniques common in the art. Preferably, an average size, N, of the segments is defined, and the upper and lower bounds are set to be N+k and N−k bits, respectively.

Note that the size of the segment must be sufficient to allow for an encoding of the non-leading-zero bits of the particular segment identifier value. Thus, some segments may not be compatible with a given random size, and another size will be requested of the random size generator 230 until a sufficiently large size is received.

Alternatively, a full-width data identifier may be defined for each segment that utilizes the maximum size, N+k, of the watermark, and this identifier is truncated as required, based on the generated random size. For example, a typical segment identifier might include a data set identifier and a segment number, the segment number being large enough to contain a unique number for each segment. Let M be the size of the segment number. The data set identifier can be defined to be N+k−M bits wide, thereby forming an N+k bit wide segment identifier. In accordance with this aspect of the invention, the most significant bits of the data set identifier are truncated as required to fit the randomly generated size of the segment and watermark. A corresponding decoder in a security system, discussed further below, will declare a segment identifier to be a part of the identified data set if the bits that are encoded match the data set identifier, the unencoded bits being treated as "wild-cards". Alternatively, the segment number may be truncated, the truncated bits being treated as wild-cards by the decoder, or a combination of truncations of the segment number and the data set identifier may be employed.

By allowing the size of the watermark to vary, the number of unique encodings of segment identifiers increases significantly. In the example of segment sizes that vary between N−k and N+k, the total number of possible unique encodings is given by:

$$U = 2^{N-k} + 2^{N-(k-1)} \ldots + 2^N \ldots + 2^{N+(k-1)} + 2^{N+k}.$$

Figure 3:
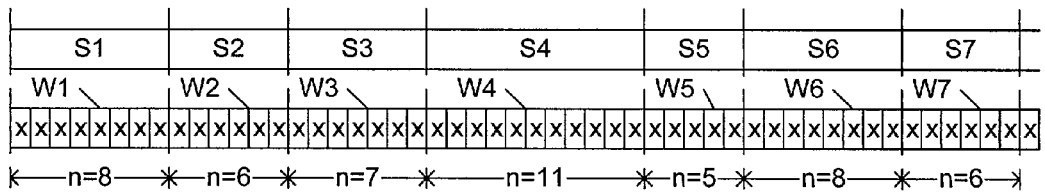
FIG. 3 illustrates an example data structure of variable length watermarked material in accordance with this invention.

FIG. 3 illustrates a typical watermark encoding of content material in accordance with this invention. Segments S1, S2, . . . S7 are watermarked with watermarks W1, W2, . . . W7, respectfully. As illustrated, the segments S1–S7 vary in size. S1 is illustrated as being eight bits wide; S2 is six bits wide; S3 is seven bits wide, and so on.

Although a purely random, or pseudo-random, selection of segment sizes may be employed, a controlled selection of segment sizes may be employed, to facilitate a search for each segment, or to assure a somewhat uniform distribution of segment sizes, or to conform to a particular standard or convention. For example, it may be desirable to not have a segment span the boundary between songs on a CD, so that each song is associated with a whole number of watermarks. Similarly, it may be desirable to assure an average segment size, to facilitate the design of a buffering system that minimizes latency in the analysis of watermarks, and so on. To achieve a consistent average segment size, for example, the pseudo-random size generator 230 of FIG. 2 may be configured to form a running average of generated sizes, or a running average of a subset of generated sizes, and to subsequently bias the generation of pseudo-random sizes toward short sizes when the running average exceeds a given limit, and toward long sizes when the running average is below a given limit. In the extreme, one or more segment sizes may be non-randomly determined, in order to force the average to remain within a given bound, or to force the end of a segment at a given point, such as the end of each song on a CD. If the variance of the random sizes about an average is suitably controlled, a search for the start of each segment can be simplified. Alternatively, an easily identifiable auxiliary signal may be added to each segment, to facilitate locating the start of each segment.

Figure 4:
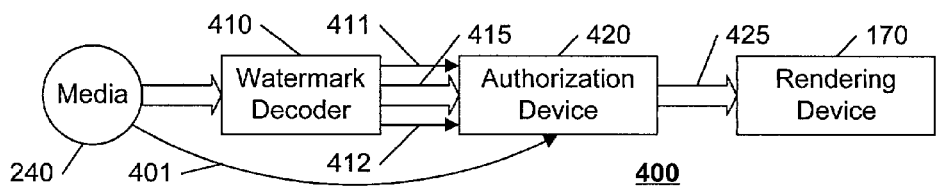
FIG. 4 illustrates an example block diagram of a security system in accordance with this invention.

FIG. 4 illustrates an example block diagram of a security system 400 that includes a decoder 410 that is configured to decode variable sized watermarks. Preferably, the decoder 410 is a conventional watermark decoder, corresponding to the watermark encoder, that is configured to also report the information content 411 associated with the watermark, as well as the size 412 of the information item, or of the segment, associated with the watermark. The authorization device 420 is configured to verify the watermarked segment, based on both the information content 411 of the decoded watermark, as well as the size 412 of the watermark or segment. The size 412 of the watermark or segment is verified via a comparison with an authorized size 401, corresponding to the encoded size of the original watermark or segment. If the watermark information 411 and size 412 are verified, the content material 415 is communicated to the renderer 170, as authorized content material 425. As is common in the art, if there is a substantial delay in determining the authorization, the authorization device 420 may be configured to provide the content material 415 initially as "as-yet-not-unauthorized" content material 425, and then terminate the transmission if the watermark information 411 and 412 are determined to be incorrect.

Any of a variety of techniques may be employed to communicate the sizes 401 of the watermarked segments at the watermark encoding system 200 of FIG. 2 to the security system 400 of FIG. 4. In a straightforward embodiment, the encoding system 200 communicates a 'seed' to the security system 400 that allows the security system 400 to generate the same set of random size parameters as used in the encoding system 200. This communication may be explicit, via for example an information item embedded in a particular watermark, or implicit. In an implicit communication, the encoding system 200 uses one or more data items in the original content material to form the seed that is used to initialize the pseudo-random size generator 230, and the security system 400 is configured to use this same one or more data items in the content material to also form the seed to generate the same set of random size parameters.

In an alternative embodiment, a list of the segment sizes, and a hash value corresponding to this list, is appended as one or more segments of the content material, such as an eight segment that follows the original seven segments S1–S7 of FIG. 3. Techniques are common in the art for appending "out of band" data to content material, to contain, for example, the aforementioned table of contents, or other ancillary information.

In the context of the unauthorized substitution system of FIG. 1, because the sizes of the watermarks in the ripped watermarked segments 130 will also be verified, based on the appended list of sizes, the list of sizes from the encoder corresponding to the encoded data set will be required to render the ripped watermark segments 130. And, because it is virtually impossible to substitute values in a watermarked list while still maintaining the original watermark, it will be virtually impossible for the unauthorized substitution system to substitute a different list of sizes to match the sizes of watermarked segments in the collection 110.

As will be evident to one of ordinary skill in the art, the encoding of the list of randomly generated segment sizes also adds a significant level of security for uniquely identifying a particular data set, and may be employed independent of a watermarking system. That is, although a preferred embodiment of this invention includes an explicit identification of a data set identifier and a segment identifier via a watermark, the list of variable sized segments based on a random selection of sizes also serves to uniquely identify the data set, and the occurrence of the proper sized segment in accordance with this list also serves to identify each segment. An exhaustive or random check of the sizes of each segment can be used to verify that the entirety of the data set is present, by comparing the actual size of each segment to the corresponding size that is specified in the list.

In like manner, because the communication of the seed value that was used to produce the randomly sized segments, either implicitly or explicitly, serves to enable the security system 400 to generate the list of segment sizes, the seed value can also serve to uniquely identify the data set. In this embodiment, the determined size of each exhaustive or randomly selected segment is compared with the corresponding pseudo-randomly generated size of the segment, based on the seed value.

As would be evident to one of ordinary skill in the art, given a list of segment sizes, the expected start of each segment can be determined, thereby facilitating a determination of the size of randomly selected segments for verification, by directing the verification process to the determined start, or to a location in the vicinity of the determined start.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is presented as a means of increasing the number of possible unique segment identifiers, the added complexity of having to provide variable sized segments may serve as a deterrent to an unauthorized substitution system, regardless of whether the watermark process is bandwidth limited. That is, when the watermarking process has abundant information carrying capacity, the system may be configured to generate watermarks having a fixed size, regardless of the random size of each segment. These and other system configuration and optimization features will be evident to one of ordinary skill in the art in view of this disclosure, and are included within the scope of the following claims.

I claim:

1. A watermarking system comprising:
    a watermark encoder that is configured to apply a watermark to each of a plurality of segments of content material to form a plurality of watermarked segments, and
    a size generator that is configured to control a size of the watermark that is applied to each of the plurality of segments, based on a random process, so that at least two watermarked segments of the plurality of watermarked segments have different watermark sizes in order for authorization of at least one of the plurality of watermarked segments be determined based on the watermark and based on the size of the watermark.

2. The watermarking system of claim 1, further comprising:
    a segmenter, operably coupled to the size generator and the watermark encoder, that is configured to control a size of each segment of the plurality of segments, based on an output of the size generator, wherein
    the size of the watermark that is applied to each of the plurality of segments is based on the size of each segment of the plurality of segments.

3. The watermarking system of claim 2, wherein the size generator controls the size of each segment.

4. The watermarking system of claim 1, wherein the random process is initialized by a seed value that is based on one or more data items in the content material.

5. The watermarking system of claim 1, wherein the random process is initialized by a seed value, and the watermarking system is further configured to include the seed value in at least one of the plurality of watermarked segments.

6. The watermarking system of claim 1, wherein the size generator is further configured to control a variance of the sizes of the plurality of segments.

7. The watermarking system of claim 1, wherein the size generator is further configured to control the size of the watermark based on one or more sizes of other segments of the plurality of segments.

8. An encoding system comprising:
    a segmenter that is configured to segment content material into a plurality of segments, and
    a size generator, operably coupled to the segmenter, that is configured to control a size of each of the plurality of segments, based on a random process, so that at least two segments of the plurality of segments have different sizes in order for authorization of at least one of the plurality of segments be determined based on the content material of said at least one of the plurality of segments and based on the size of said at least one of the plurality of segments.

9. The encoding system of claim 8, further including a watermark encoder that is configured to apply a watermark to each of the plurality of segments of content material to form a plurality of watermarked segments.

10. The encoding system of claim 8, wherein the random process is initialized by a seed value that is based on one or more data items in the content material.

11. The encoding system of claim 8, wherein the random process is initialized by a seed value, and the encoding system is further configured to include the seed value in at least one of the plurality of segments.

12. The encoding system of claim 8, wherein the size generator further controls the size of each segment based on one or more sizes of other segments of the plurality of segments.

13. A security system comprising:
    a watermark detector that is configured to determine an information item from a watermarked segment of watermarked content material and to determine a size of the information item, and an authorization device, operably coupled to the watermark detector, that is configured to determine an authorization of the watermarked segment, based on the information item and based on the size of the information item.

14. The security system of claim 13, further including a random size generator, operably coupled to the authorization device, that is configured to provide an authorized size of the information item based on a seed value, wherein the authorization device is configured to determine the authorization based on a comparison of the size of the information item and the authorized size of the information item.

15. The security system of claim 14, wherein the seed value is included in the watermarked content material.

* * * * *